Nov. 9, 1965  R. E. HENDERSON  3,217,292
SAFETY DEVICE FOR MOTOR VEHICLES
Filed Jan. 9, 1963  3 Sheets-Sheet 1
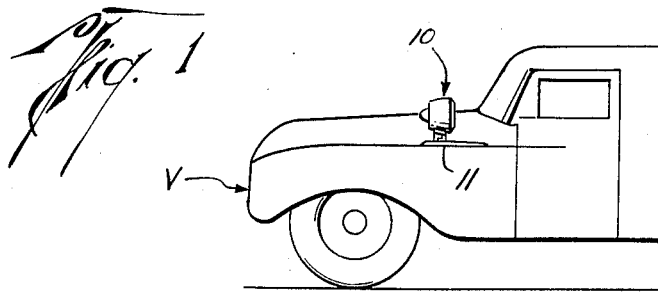
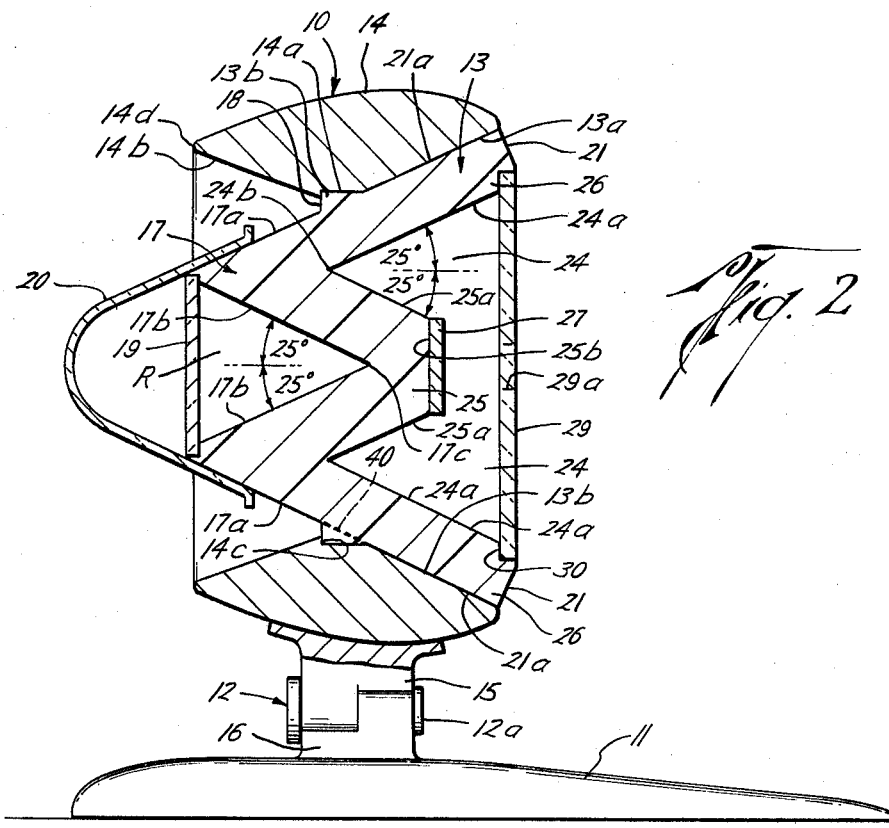
Robert E. Henderson
INVENTOR.
BY Vincent Martin
Joel E. Edwards
M. H. Gay
ATTORNEYS

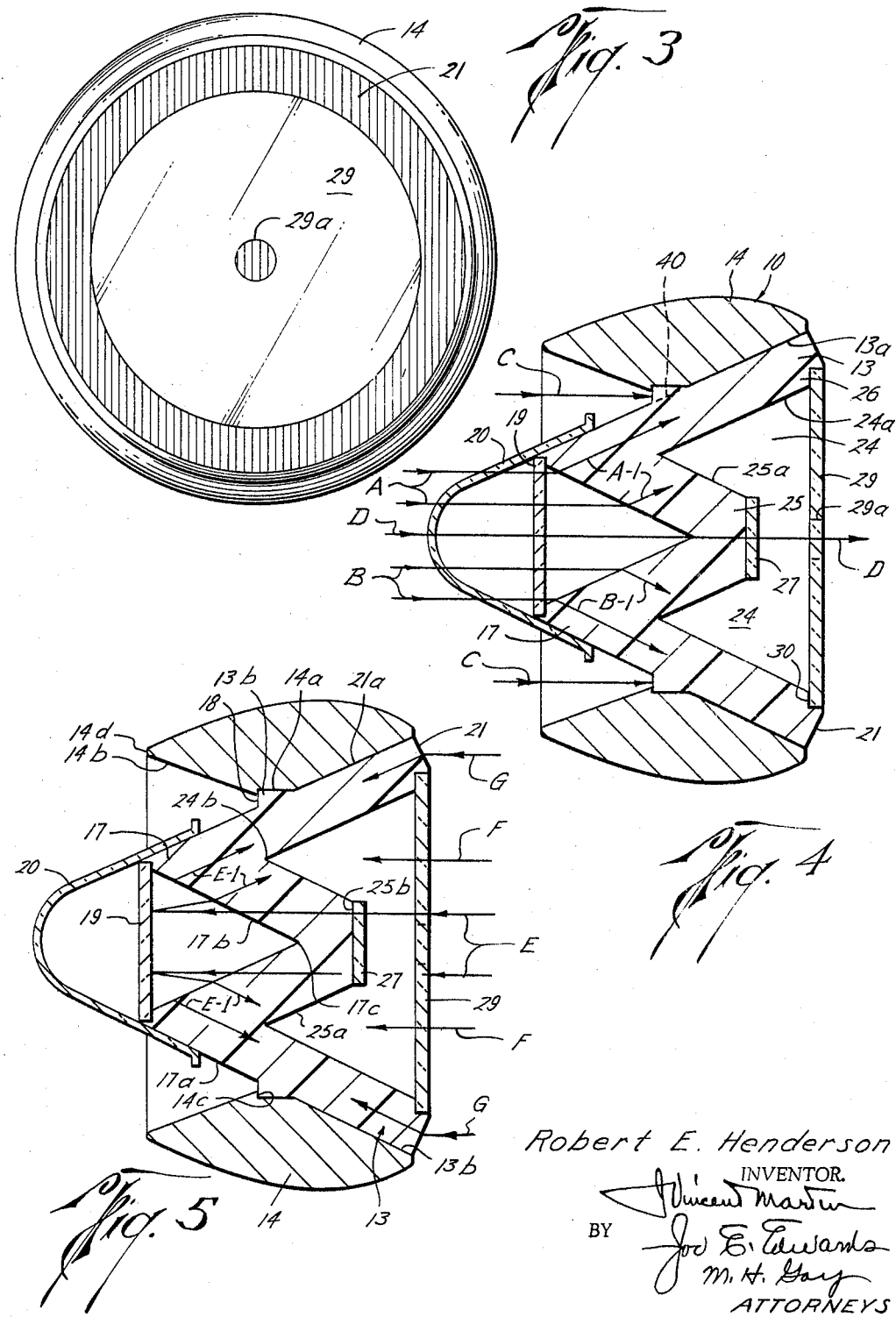

Nov. 9, 1965  R. E. HENDERSON  3,217,292
SAFETY DEVICE FOR MOTOR VEHICLES
Filed Jan. 9, 1963  3 Sheets-Sheet 3

Robert E. Henderson
INVENTOR.
BY
ATTORNEYS

United States Patent Office 3,217,292
Patented Nov. 9, 1965

3,217,292
SAFETY DEVICE FOR MOTOR VEHICLES
Robert E. Henderson, P.O. Box 344, Henderson, Tex.
Filed Jan. 9, 1963, Ser. No. 250,984
17 Claims. (Cl. 340—34)

This invention relates to new and useful improvements in safety devices for motor vehicles and relates particularly to a combined signal and rear view mirror device for mounting on the driver's side of said vehicle.

This application is a continuation-in-part of my co-pending application, Serial No. 148,626, filed October 30, 1961.

In night driving on a two-lane highway, passing of a slower traveling vehicle requires that the driver of the passing vehicle move out into the opposite lane for oncoming traffic, and in many instances, it is difficult to determine whether or not such opposite traffic lane is clear. For example, when attempting to pass a large truck under night driving conditions, it is difficult to see around said truck without the driver moving the passing vehicle at least partially into the opposite traffic lane; also, if a following vehicle is attempting to simultaneously pass, the pulling out of a vehicle from its normal traffic lane may result in a collision. If the driver of a motor vehicle can be warned that another vehicle is approaching in the oncoming lane or that a vehicle is moving up from the rear in such lane before the driver has swung his vehicle or a substantial part thereof into such lane, many highway collisions occurring under night driving conditions would be avoided.

It is, therefore, one object of this invention to provide an improved safety device which is mounted on the driver's side of a motor vehicle and which functions to signal the driver of another vehicle approaching in the opposite or oncoming lane of traffic and which operates the instant that the driver begins to move his vehicle into such lane and before any appreciable part of his vehicle has crossed the usual center line stripe, whereby the driver is instantaneously warned of the approaching vehicle; said device also being activated if a vehicle from the rear is traveling in said opposite lane to warn the driver that another vehicle may be attempting to pass.

An important object of the invention is to provide a safety signal device which is adapted to be mounted on the driver's side of the vehicle, preferably along or projecting slightly outside of the outer limit of the side of the vehicle, and which is activated to produce a warning signal when the lights of an oncoming vehicle or the lights of a vehicle approaching from the rear and traveling in the opposite traffic lane strike said device, whereby the driver is given immediate warning against moving his vehicle into said opposite lane.

A particular object is to provide an improved safety device which combines a light-activated signal means with a side-type rear view mirror, whereby said device normally functions as a rear view mirror but under night driving conditions, operates to instantaneously signal or warn the driver against swinging or moving his vehicle into the opposite or oncoming traffic lane.

Another object is to provide a combined signal and rear view mirror device wherein a translucent body through which light rays may be diffused and reflected is so combined with a colored semi-reflector element and a two-way mirror that light striking the device either from the front or from the rear will cause a portion of the unit which is visible to the driver at all times to glow brilliantly and thereby provide a warning signal to the vehicle driver.

Another object is to provide a combined signal and rear view mirror device of the character described together with an electrical circuit including a light-sensitive cell disposed in said device for actuating a light located in the vehicle's instrument panel whereby light striking said cell energizes the circuit to thereby provide a warning signal for the driver.

Other objects, features and advantages of this invention will be apparent from the drawings, the specification and the claims.

In the drawings, wherein like reference numerals indicate like parts, and wherein an illustrative embodiment of this invention is shown:

FIGURE 1 is a schematic view of the forward portion of a motor vehicle illustrating the mounting of the improved signal and rear view mirror device, constructed in accordance with the invention, mounted thereon;

FIGURE 2 is an enlarged vertical sectional view of said signal and rear view mirror device;

FIGURE 3 is an elevation of the device viewing it from the rear as it is seen by the motor vehicle driver;

FIGURE 4 is a view similar to FIGURE 2 and illustrating the manner in which light rays striking the forward end of the device will illuminate it to create a warning signal;

FIGURE 5 is a similar view, showing the illumination to create a warning signal by reason of light rays being directed from the rear of the device;

Figure 6:
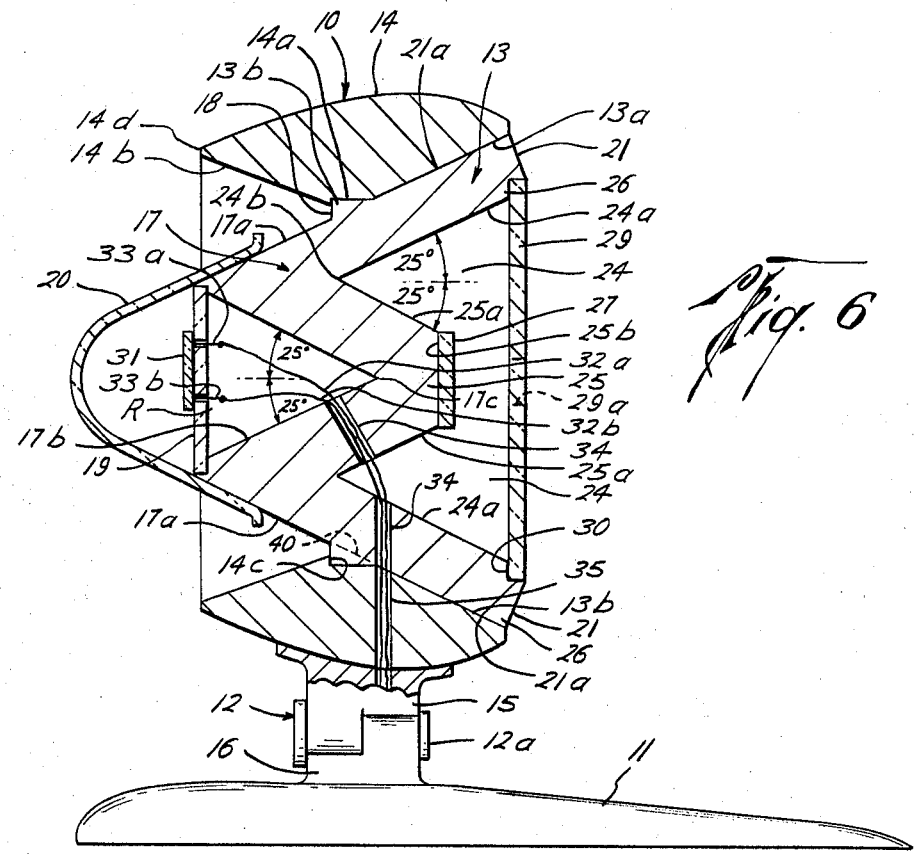
FIGURE 6 is a sectional view similar to FIGURE 2, but illustrating a modified form of the device; and, FIGURE 7 is a schematic illustration of an electrical circuit used with the modified form of the device shown in FIGURE 6.

In the drawings (FIGURE 1), the improved signal and rear view mirror device is generally indicated at 10 and is adapted to be mounted by means of a bracket 11 upon the fender of a motor vehicle V. The device is preferably mounted on the fender or side area of the vehicle adjacent to and slightly forward of the driver's side and is positioned in the usual place that a side rear view mirror is located. Although the device may have its outer periphery substantially in the same plane as the side of the motor vehicle, it may be moved outwardly a slight distance beyond said side, which adjustment is permitted by means of an adjustable pivot mounting 12 which connects the device 10 with the mounting bracket.

The device 10 is shown in detail in FIGURE 2 and includes a main body portion 13 which is constructed of a translucent material, such as Lucite, plastic or other suitable material through which light rays may be diffused, reflected and distributed in a desired manner. The particular cross-sectional shape of the body 13 is of importance to the present invention and will be hereinafter described in detail. The body is mounted within the bore 14a of an annular ring or housing 14 which is preferably constructed of metal and which may have its outer surface chrome-plated in the usual manner. The forwardly-directed portion of the bore of the ring or housing is flared outwardly as shown at 14b. The mounting 12 includes interconnected lugs 15 and 16 one on the body and the other on the bracket 11, and a connecting pin 12a secures the lugs 15 and 16 together with the ring or housing 14 in properly adjusted position relative to the mounting bracket.

The body is generally circular in shape and has the major portion of its main peripheral surfaces 13a inclined or tapered (FIGURE 2) and the forward end of said inclined surface terminates in an annular projection 13b which presents a forwardly facing flat shoulder 18. The bore 14a of the housing or ring 14 has complementary surfaces so that the body fits within said bore with the outer portion of said shoulder 18 abutting a stop shoulder 14c in said bore. The body may have a snug fit within the bore of said housing and may be fastened therein by any suitable means, such as screws or the like (not shown). Extending forwardly from the main peripheral surface of the body is an integral frusto-conical projection 17 which will for simplicity be hereinafter referred to as the forward cone. The base of the cone 17 intersects the forwardly-facing annular flat shoulder 18 and the outer tapered surface 17a of the cone extends at substantially the same angle with respect to the axis of the body as the angle of inclination of the inclined surface 13a of the body. The forward end of said cone preferably terminates in a plane spaced inwardly from the front edge 14d of the housing.

A conical recess R is formed within the forwardly-directed cone 17 and has its wall surface 17b inclined at a predetermined angle with respect to the axis of the body 13. The depth of the recess is such as to locate the apex 17c of said recess in a transverse plane inwardly of the annular projection 13b of the body 13. A colored semi-reflector element 19 is suitably secured within a recessed area at the forward end of the cone 17 and overlies the conical recess R. The element 19 is referred to as a "semi-reflector" because, as will be hereinafter seen, said element allows passage of light rays but also acts to reflect some of said light rays. It is preferable that said semi-reflector element be red although it may be of any other desired color. Because the element 19 is colored and is disposed on the forward end or side of the device and because most state laws prohibit vehicles, other than emergency vehicles, from displaying any colored light or illumination, other than amber or white, on the front of said vehicle, the semi-reflector element 19 is covered by a reflector 20 which is preferably amber in color and which is suitably secured in position by cement or other means. As shown in FIGURE 2, the reflector 20 overlies the outer end portion of the cone 17 and, as will be explained, renders the color of the semi-reflector element, as well as any colored illuminated of the cone 17, invisible when viewed from the front of the vehicle upon which the device 10 is mounted.

The foregoing description relates to the construction of the forwardly-directed end of the device and the forward end or side of the body 13. It is this end or side which is facing in a forward direction with respect to the direction of travel of the vehicle.

At its rearwardly-directed end or side, the peripheral portion of the exterior of the body 13 is formed with an annular beveled surface 21 and when the body is in position within the support ring or housing 14, this rearwardly-directed beveled or inclined surface 21 of the body is disposed outside of the housing and is at all times clearly visible to the driver from his position within the vehicle. Although the particular angle of the inclination of the surface 21 is subject to variation, it has been found that excellent results are obtainable when the beveled surface is at an angle of approximately sixty degrees from a plane parallel to the axis of the body.

The rearwardly-directed surface of the translucent body 13 is contoured and shaped to produce proper distribution, diffusion and reflection of light rays. A relatively deep, annular recess 24 is cut into this rearwardly-directed surface and said recess is substantially V-shaped in cross-section with its outer wall 24a being inclined at an angle with respect to the axis of the body; preferably the inclination of this wall is substantially parallel to the inclined outer surface 17a of the forward cone 17.

In cutting the annular recess, the inner wall of said recess defines the outer surface 25a of a rearwardly-directed frusto-conical projection 25 which will hereinafter be referred to in this description as the rearward cone and which is located centrally of the body 13. The angle of inclination of the wall 25a of the rearward cone relative to the axis of the body is preferably the same as the angle of inclination of the surfaces 17b of the conical recess R in the forward cone 17, whereby the surfaces 25a and 17b are in parallel relationship. The depth of the annular recess is such that its innermost end 24b is disposed forwardly of and therefore overlaps the inner portion of the conical recess R in a transverse plane. The flat end surface 25b of the rear cone 25 is located inwardly of the rearmost edge of the body 13. The rear portion of the body is, in effect, an annular flange portion 26, the outer surface of which is the exposed beveled surface 21.

A colored semi-reflector element 27, which is preferably red in color, overlies the flat end 25b of the rearward cone 25 and this element may be cemented or otherwise suitably secured in place. Spaced rearwardly from the semi-reflector element 27 is a double morror 29 which, as is well known, is one through which light rays may pass but yet either side provides a reflector mirror surface. The mirror is mounted and properly fastened by any well known means within an annular recess 30 in the flange portion 26 of the body 13 and said mirror completely overlies the cone 25, semi-reflector element 27 and annular recess 24. Thus, the mirror encloses the rear end or side of the body 13 except for that area of the flange 26 beyond the mirror, which area is for all practical purposes the area of the beveled or inclined surface 21 which is at all times exposed to view. If desired, the central portion 29a of the mirror may be left clear so that there will be a central circular spot in the mirror 29 which does not have the properties of the mirror surface; however, as will be obvious from the description of the operation of the unit, the provision of the clear area is merely a matter of choice.

As has been explained, the device is mounted on the driver's side of the motor vehicle and is positioned so that the mirror 29 and the annular beveled surface 21 of the body 13 are within the clear vision of the driver. During daytime driving the device merely functions as a rear view mirror. However, under night driving conditions, the movement of the device into the path of any light rays results in the flange 26 and particularly the annular beveled surface 21 of the body being illuminated, and with semi-reflector elements 19 and 27 being red, such illumination will be of a red color. If the central clear area 29a in the mirror 29 is employed, a circular illuminated spot of red color will appear at the mirror center.

As will be explained, the illumination occurs if the lights of an approaching vehicle strike the forward end of the device or if the lights of a following vehicle strike the rear end thereof. Where the lights of an approaching car are directed into the forward end, the illumination of the flange 26 and surface 21 produces an illuminated annular ring which warns the driver that a car is approaching in the on-coming lane of traffic. Similarly, if light strikes the device from the rear by reason of a car traveling in the opposite lane and approaching from the rear, the same warning signal is given. Light rays striking the device from either direction not only produce the warning signal as represented by the annular beveled surface 21, but at the same time, the forward amber colored reflector member 20 is illuminated to shield the forward lens 19 from view and said amber member is visible to an approaching car in the manner of a side running light. Although light rays from either direction illuminate the annular flange 26 and surface 21 to produce a colored warning signal, there is no color projected into the forwardly-directed flat shoulder surface 18. Therefore, no red color is visible to an approaching vehicle so that the device complies with highway regulations as to vehicle lighting.

The ultimate result of illuminating the annular beveled surface 21 by light rays striking the device from either front or rear is produced by reason of the various angular surfaces and the position of the colored semi-reflector elements 19 and 27. Experience has shown that the angles of inclination of the surfaces 17a and 17b of the cone 17 and recess R, as well as the angles of inclination of the surfaces 24a and 25a of the recess 24 and rear cone 25 are subject to some variation. By properly inclining these surfaces and relating them to each other, a brilliant illumination of the surface 21 may be obtained without any illumination of the forwardly facing shoulder 18.

Without restricting the invention and merely as exemplary of one structure which has been found suitable, the angular disposition of surface 17a of the forward cone and the inclined surface 24a of the recess with respect to the axis of the body may be twenty-five degrees. Similarly, the inclination of the surface 17b of recess R and the outer surface 25a of the rear cone may also be twenty-five degrees with respect to the axis of the body. As previously noted, the rear annular beveled surface may be approximately sixty degrees with respect to a plane parallel to the axis of the body. Not only are the angles of inclination of importance, but the position of the inclined surfaces with respect to each other must be such as to produce the desired result. For instance, it is desirable that the apex 17c of the recess R lie in a transverse plane inwardly of the innermost point 24b of the recess 24 so that the inner portions of the recess R and 24 are in overlapping relationship; also it is preferable that the flat forwardly directed shoulder 18 be disposed forwardly, in a transverse plane, of the apex 17c of the recess R. Attention is also called to the fact that the inclined surface 13a of the body portion is, in effect, a continuation of the surface 17a of the forward cone so that the projection 13b on the body lies outside of a plane which would connect the surfaces 17a and 13a, such plane being indicated by the dotted line 40 in FIGURE 2. Although the angle of twenty-five degrees with respect to the axis of the body has been found satisfactory, this angle may be increased or reduced, but any change in the angle of inclination of the various surfaces would, of course, require some change in the relative position of the surfaces with respect to each other and to the beveled surface 21 and forwardly facing shoulder 18 to maintain the desired distribution of light rays to produce the result.

With respect to the diameters of the various parts, these may also be varied within limits. With the angular surfaces at a twenty-five degree angle, the following dimensions of the various parts have been found satisfactory. The outer diameter of the rear end of the body 13 is approximately three and eleven-sixteenths inches; the diameter of the mirror, three inches; the diameter of lens element 27, three-fourths inch; and the diameter of the forward lens element 19, one and three-eights inch. The length of the body, with these dimensions, is approximately two and nine-sixteenths inches, measured from the rear surface of the mirror to the forward end of the forward cone 17. These figures are enumerated merely as exemplary and so long as the various general relationship of the parts, as illustrated in the drawings, is maintained, the device will function properly.

Although the exact manner in which all light rays are distributed, diffused and reflected within the material of the translucent body 13 by reason of the various angular surfaces is difficult of explanation, it is believed that the colored illumination of the annular flange 26 and its beveled surface 21 is produced in the general manner shown in FIGURES 4 and 5.

FIGURE 4 is illustrative of the operation when light rays are directed into the forward end or front side of the device. In this case, some of the light rays striking the device from its forward end are indicated by the lines A, B, C and D. Considering the light rays A and B, such rays first strike the amber element 20 and some of them pass through said element; portions are reflected from the outer surface to render the amber member visible to the approaching vehicle. The rays passing through the member 20 then pass through the red semi-reflector element 19 and a portion of these may be reflected back to further illuminate the member 20. The light rays passing through the semi-reflector element 19 are now colored and are directed into contact with the inclined surface 17b of the conical recess R. Upon contact with the surface 17b, the colored rays are refracted along the general paths A-1 and B-1 and are thus directed into the flange 26 to illuminate its outer beveled surface 21. The plane of the outer inclined surface 17a of the cone 17 relative to beveled surface 21 and flange 26 is such that colored rays are not directeed into the area adjacent the forwardly-directed flat shoulder 18 and this area, as shown by dotted lines 40, remains clear of color.

Other light rays C pass directly into the exposed portion of said flat annular shoulder 18 and although uncolored, assist in illuminating the annular flange 26. The center ray D which is directed along the axis of the body is colored as it passes through semi-reflector 19 and also through lens 27 and is visible through the center opening 29a. Some of the rays A-1 and B-1 are directed into the recess 24 and by reflection and refraction pass through semi-reflector 27 and back into the flange 26 of the body. This provides an additional color source of illumination.

It will be understood that the entire forward end of the device may be exposed to light rays and the few light ray lines A, B, C and D indicated on FIGURE 4 are merely illustrative. The result accomplished, however, is that the colored illumination is diffused within the translucent body 13 and is directed into the annular flange 26 to cause its surface 21 to be brilliantly illuminated as an annular red warning signal. If the central portion 29a of the mirror 29 is clear, a bright red spot, by reason of the illumination of the semi-reflector 27 is also produced. Because the mirror is a double mirror and may pass some light rays, the overall mirror surface takes on a reddish glow and although not nearly as brilliant as the beveled annular surface 21, this glow also provides some illumination increasing the warning signal. In actual practice, the reddish glow imparted to the double mirror does not materially interfere with the reflecting quality of the mirror so that it continues to function as a rear view mirror.

By properly mounting the device at the side or in the same plane as the side of the vehicle, it will be evident that if the driver is considering passing another vehicle and begins to move his vehicle into the opposite lane of on-coming traffic, the presence of an approaching car will be immediately and instantaneously signaled. The instant that the device or any portion thereof catches any light rays from an approaching car, the beveled annular surface 21 glows with a red color. This illumination creates a warning signal which occurs long before any part of the vehicle itself has moved across the center line of a two-lane highway and the driver is given an instantaneous signal that a car is approaching. The device thus indicates to the driver whether or not a car is approaching in the on-coming traffic lane without the driver having to pull his vehicle far enough out into such on-coming lane in order to visually observe whether or not such car is present.

In many instances a car approaching from the rear may be in passing position in the left-hand lane and the driver of the leading car may turn out in front of such a passing car. The present device also gives the driver of a vehicle warning that a car from the rear is approaching in the on-coming or left-hand lane and in FIGURE 5, the manner in which the device is believed to be illuminated by the lights from the rear car is illustrated. Certain of the light rays E pass directly through the central portion of the two-way mirror 29, through the rear colored semi-reflector 27 and are directed against the forward semi-reflector 19; these rays are colored and are reflected back into the conical recess to strike the wall 17b, whereby they are refracted, as shown by the arrows E-1, into the annular flange 26 to illuminate the surface 21. Other rays, designated F, pass into the recess 24 to strike the inclined walls 24a and 25a, from which they are reflected and distributed within the body 13; these rays are uncolored and provide illumination of the body. Additional uncolored illumination is gained by light rays G contacting the beveled surface 21 and being directed inwardly toward the conical recess in the forward cone. Obviously, some of the light rays will pass through the forward semi-reflector element 19 to illuminate the forward amber member 20.

It is noted that the diameter of the rearward semi-reflector element 27 is less than the diameter at the base of the forward cone 17 so that the light rays F which pass into and through body 13 outwardly through the area of the flat shoulder 18 are not colored. This assures that no red color is imparted to the front side of the unit. The reflected light is, by reason of the various angular surfaces and the positions of the colored elements 19 and 27, directed into the area of the annular flange 26 so that its surface 21 is caused to glow brilliantly and produce an instantaneous warning signal.

Under night driving conditions, the combined signal and rear view mirror device gives the driver of a vehicle immediate warning whenever the lights of another vehicle strike the device either from its forward end or from its rear end. By locating the device in substantial alignment or in the same plane as the side of the motor vehicle, it is only necessary for the driver to begin to move his vehicle into the left-hand traffic lane in order for the device to pick up light rays from either an on-coming car or the car approaching from the rear. As soon as any light rays strike the device, the translucent body 13 is illuminated and the annular beveled surface 21, which is readily visible to the driver, takes on a brilliant color to provide a clearly visible warning signal. During daytime driving, the provision of the double mirror permits the device to be employed as the usual rear view side mirror. Although it has been found that plastic material such as Lucite, which is translucent, is particularly applicable for use as the body 13, any suitable material capable of receiving and diffusing light therethrough may be employed.

FIGURE 6 illustrates a modified form of the device 10 shown in FIGURE 2. A photo-electric light sensitive cell 31 is disposed adjacent the semi-reflector 19. The cell 31 may be sensitive to light from its right or left, or both directions, as desired. Also, it is obvious that the cell 31 could be disposed at other locations within the device 10; the only requirement being that the cell receive sufficient light from the desired direction or directions for actuation of said cell.

Electrical leads or wires 32a and 32b are connected to the usual terminals 33a and 33b at the back of the cell 31. The leads 32a and 32b pass through suitable holes 34 and 35 in the body 13 and housing 14 to complete the circuit schematically illustrated by FIGURE 7. The components in the circuit in addition to the photo-electric cell 31 include the vehicle's electrical power source 36, an on-off switch 37 (which may be conveniently actuated by the usual headlight switch), a variable amplifier 38 for adjusting the circuit as desired, suitable relay 39, and a bulb 40 located in the vehicle's instrument panel for signaling the driver.

Figure 7:
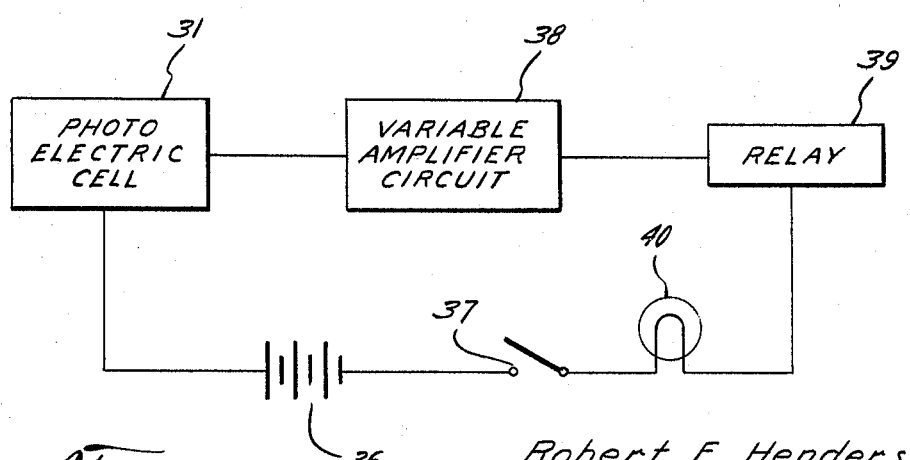

The operation of the modified device is believed obvious. The body 13 and semi-reflector elements 19 and 27 operate in the manner previously described. Assuming that the switch 37 is in the "on" position, the light which actuates or lights the body 13 also energizes the light-sensitive cell 31 whereby the circuit in FIGURE 7 is completed and the bulb 40 is lighted so that the driver is duly warned. Of course, the bulb 40 may be made to flash intermittently if desired to enhance its usefulness as a warning or signal. The light sensitive cell 31 acts as a variable resistor depending upon the intensity of the light beam striking such cell 31. The current thus generated by the light beam impinging upon the cell 31 is amplified by the variable amplifier 38 to sufficient degree to trip or actuate the relay 39 whereby the circuit is completed and the bulb 40 is lighted.

The foregoing disclosure and description of the invention is illustrative and explanatory thereof and various changes in the size, shape and materials, as well as in the details of the illustrated construction, may be made within the scope of the appended claims without departing from the spirit of the invention.

What I claim is:

1. A safety device for motor vehicles including,
   an annular housing having means for mounting the same on the side of a motor vehicle,
   a generally circular body constructed of translucent material supported within the housing and having its rearwardly-directed peripheral portion exposed to view from the rear of the device,
   said body having angular light-reflecting surfaces formed in its forwardly-directed and its rearwardly-directed sides for directing and concentrating the light rays which strike either of said sides into the peripheral portion which is exposed to view from the rear of the device to thereby illuminate said peripheral portion,
   and, colored semi-reflector elements adjacent each side of the body and coacting with said angular surfaces to impart color to the illuminated peripheral portion, whereby said peripheral portion functions as a warning signal when light rays strike either side of said device.

2. A safety device as set forth in claim 1, together with
   a two-way mirror member overlying the major portion of the rear side of the body and covering that semi-reflector element adjacent the rearwardly-directed side, whereby only the rearwardly-directed peripheral portion of the body is visible from the rear of the device.

3. A safety device as set forth in claim 1, together with
   a two-way mirror member overlying the major portion of the rear side of the body and covering that semi-reflector element adjacent the rearwardly-directed side, whereby only the rearwardly-directed peripheral portion of the body is visible from the rear of the device, and
   a reflector member enclosing the semi-reflector element adjacent the forwardly-directed side of the body for rendering said semi-reflector element invisible when viewing the same from the front of the device, said reflector member being of a color different than the color of the semi-reflector element which it encloses.

4. A safety device for motor vehicles including,
   an annular housing having means for mounting the same on the side of a motor vehicle in a position to locate its rear end within the view of the operator, a generally circular solid body constructed of translucent material supported axially within the housing and having its forward and rear sides uncovered by the housing,
   a forwardly-extending frusto-conical projection formed on the central portion of the body and having a conical recess therein,
   a colored semi-reflector element overlying the conical recess,
   the rear side of the body having an annular recess therein which is of general V-shape in cross-section to form a rearwardly-directed frusto-conical projection at the central portion of said rear side and to also form a rearwardly directed annular flange,
   and a colored semi-reflector element overlying the rearwardly-directed frusto-conical projection and a portion of the annular recess,
   said colored semi-reflector elements coacting with the inclined surface of the conical recess in the forwardly-directed frusto-conical projection and also with the inclined surfaces of the rearwardly-directed frusto-conical projection and the surfaces of the recess to direct light rays striking either side of said body into the area of the rearwardly-directed annular flange to illuminate said flange in color and cause it to function as a warning signal.

5. A safety device as set forth in claim 4 together with
a two-way mirror member mounted within the rearwardly-directed annular flange and spaced from the colored semi-reflector element which overlies the rearwardly-directed frusto-conical projection and the recess to render both said projection and said recess invisible when viewed from the rear of the device.

6. A safety device as set forth in claim 4 together with
a two-way mirror member mounted within the rearwardly-directed annular flange and spaced from the colored semi-reflector element which overlies the rearwardly-directed frusto-conical projection and the recess to render both said projection and said recess invisible when viewed from the rear of the device,
and a reflector member enclosing the major portion of the forwardly-directed frusto-conical projection and overlying the forward colored semi-reflector element to render said semi-reflector element and said projection invisible when viewed from the front of the device.

7. A safety device as set forth in claim 4 together with
a two-way mirror member mounted within the rearwardly-directed annular flange and spaced from the colored semi-reflector element which overlies the rearwardly-directed frusto-conical projection and the recess to render both said projection and said recess invisible when viewed from the rear of the device, the surface of the conical recess formed in the forwardly-directed projection being disposed at substantially the same angle of inclination from the axis of the body as is the outer inclined surface of the frusto-conical projection on the rear side of the body.

8. A safety device as set forth in claim 4 together with
a two-way mirror member mounted within the rearwardly-directed annular flange and spaced from the colored semi-reflector element which overlies the rearwardly-directed frusto-conical projection and the recess to render both said projection and said recess invisible when viewed from the rear of the device, the surface of the conical recess formed in the forwardly-directed projection being disposed at substantially the same angle of inclination from the axis of the body as is the outer inclined surface of the frusto-conical projection on the rear side of the body,
and the outer surface of the forwardly-directed frusto-conical projection being disposed at substantially the same angle of inclination as to annular surface which defines the outer wall of the annular recess in the rear side of the body.

9. A safety device for motor vehicles including,
a generally circular solid body constructed of translucent material,
means for mounting said body on the side of a motor vehicle with its front and rear sides exposed to view from the front and rear respectively of the vehicle,
the front side of said body having inclined surfaces formed therein,
the inclination of the surfaces in both front and rear sides being at a predetermined angle with respect to the axis of the body and also being at substantially the same angle of inclination relative to the axis,
the disposition of the various surfaces being so related to each other that light rays striking the front side of the device are directed and concentrated into the area of the rear peripheral portion of the body to illuminate the same,
and means adjacent each side of the body for imparting a desired color to the light rays which illuminate the rear peripheral portion of the body.

10. A safety device for motor vehicles including,
a generally circular solid body constructed of translucent material,
means for mounting said body on the side of a motor vehicle with its front and rear sides exposed to view from the front and rear respectively of the vehicle,
the front side of said body having inclined surfaces formed therein,
the inclination of the surfaces in both front and rear sides being at a predetermined angle with respect to the axis of the body and also being at substantially the same angle of inclination relative to the axis,
the disposition of the various surfaces being so related to each other that light rays striking the front side of the device are directed and concentrated into the area of the rear peripheral portion of the body to illuminate the same,
a forward colored semi-reflector element contiguous to the front side of the body,
a rear colored semi-reflector element contiguous to the rear side of the body,
said colored semi-reflector elements coacting with the inclined surfaces to impart color to the illumination of the rear peripheral portion of the body.

11. A safety device as set forth in claim 10 together with
a reflector member overlying the front side of the body to cover the forward semi-reflector element and that portion of said front side which is illuminated by the light rays being diffused within the body, whereby the forward semi-reflector element and any illumination of the front side of the body is not visible to an observer viewing the device from its front side.

12. A safety device as set forth in claim 10 together with,
a reflector member overlying the front side of the body to cover the forward semi-reflector and that portion of said front side which is illuminated by the light rays being diffused within the body, whereby the forward semi-reflector element and any illumination of the front side of the body is not visible to an observer viewing the device from its front side,
and a two-way mirror member overlying substantially all of the area of the rear side of the body except the illuminated peripheral portion, whereby the rear semi-reflector element and any part of the body portion which is illuminated other than said peripheral portion is invisible to an observer viewing the device from the rear.

13. A safety device as set forth in claim 10 together with,
a reflector member overlying the front side of the body to cover the forward semi-reflector element and that portion of said front side which is illuminated by the light rays being diffused within the body, whereby the forward semi-reflector element and any illumination of the front side of the body is not visible to an observer viewing the device from its front side,
and a two-way mirror member overlying substantially all of the area of the rear side of the body except the illuminated peripheral portion, whereby the rear semi-reflector element and any part of the body portion which is illuminated other than said peripheral portion is invisible to an observer viewing the device from the rear,
the central portion of said two-way mirror being clear whereby the central area of the rear semi-reflector element is visible when illuminated.

14. A safety device as set forth in claim 10 together with
light sensitive means disposed in said body, and an electrical circuit including said light sensitive means together with a bulb disposed in said vehicle for ready viewing by the operator of said vehicle,
said light sensitive means responsive to light rays striking at least one side of said light sensitive means to complete said electrical circuit and illuminate said bulb.

15. A safety device for motor vehicles including,
an annular housing having means for mounting the same on the side of a motor vehicle in a position to locate its rear end within the view of the operator,
a generally circular solid body constructed of translucent material supported axially within the housing and having its forward and rear sides uncovered by the housing,
a forwardly-extending frusto-conical projection formed on the central portion of the body and having a conical recess therein,
a colored semi-reflector element overlying the conical recess,
the rear side of the body having an annular recess therein which is of general V-shape in cross-section to form a rearwardly-directed frusto-conical projection at the central portion of said rear side and to also form a rearwardly-directed annular flange,
a colored semi-reflector element overlying the rearwardly-directed frusto-conical projection and a portion of the annular recess,
said colored semi-reflector elements coacting with the inclined surface of the conical recess in the forwardly-directed frusto-conical projection and also with the inclined surfaces of the rearwardly-directed frusto-conical projection and the surfaces of the recess to direct light rays striking either side of said body into the area of the rearwardly-directed annular flange to illuminate said flange in color and cause it to function as a warning signal,
light sensitive means disposed in said body,
and an electrical circuit including said light sensitive means together with a bulb disposed in said vehicle for ready viewing by the operator of said vehicle,
said light sensitive means responsive to light rays striking at least one side of said light sensitive means to complete said electrical circuit and illuminate said bulb.

16. A safety device for motor vehicles including,
an annular housing having means for mounting the same on the side of a motor vehicle,
a generally circular body constructed of translucent material supported within the housing and having its rearwardly-directed peripheral portion exposed to view from the rear of the device,
said body having angular light-reflecting surfaces formed in its forwardly-directed and its rearwardly-directed sides for directing and concentrating the light rays which strike either of said sides into the peripheral portion which is exposed to view from the rear of the device to thereby illuminate said peripheral portion,
colored semi-reflector elements adjacent each side of the body and coacting with said angular surfaces to impart color to the illuminated peripheral portion, whereby said peripheral portion functions as a warning signal when light rays strike either side of said device,
light sensitive means disposed in said body,
and an electrical circuit including said light sensitive means together with a bulb disposed in said vehicle for ready viewing by the operator of said vehicle,
said light sensitive means responsive to light rays striking at least one side of said light sensitive means to complete said electrical circuit and illuminate said bulb.

17. A safety device for motor vehicles including,
a generally circular solid body constructed of translucent material,
means for mounting said body on the side of a motor vehicle with its front and rear sides exposed to view from the front and rear respectively of the vehicle,
the front side of said body having inclined surfaces formed therein,
the inclination of the surfaces in both front and rear sides being at a predetermined angle with respect to the axis of the body and also being at substantially the same angle of inclination relative to the axis,
the disposition of the various surfaces being so related to each other that light rays striking the front side of the device are directed and concentrated into the area of the rear peripheral portion of the body to illuminate the same,
means adjacent each side of the body for imparting a desired color to the light rays which illuminate the rear peripheral portion of the body,
light sensitive means disposed in said body,
and an electrical circuit including said light sensitive means together with a bulb disposed in said vehicle for ready viewing by the operator of said vehicle,
said light sensitive means responsive to light rays striking at least one side of said light sensitive means to complete said electrical circuit and illuminate said bulb.

No references cited.

NEIL C. READ, *Primary Examiner.*